United States Patent
Yang

(10) Patent No.: US 7,710,454 B2
(45) Date of Patent: May 4, 2010

(54) VIDEO BIT STREAM TEST

(75) Inventor: Chao-Kung Yang, Huntington Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 12/110,689

(22) Filed: Apr. 28, 2008

(65) Prior Publication Data

US 2008/0198233 A1 Aug. 21, 2008

Related U.S. Application Data

(63) Continuation of application No. 10/900,845, filed on Jul. 27, 2004, now Pat. No. 7,391,434.

(51) Int. Cl.
*H04N 17/00* (2006.01)
(52) U.S. Cl. ..................................... 348/180
(58) Field of Classification Search ................ 348/181, 348/187, 189, 180, 192, 193
See application file for complete search history.

(56) References Cited

U.S. PATENT DOCUMENTS

| | | | |
|---|---|---|---|
| 5,706,002 A | 1/1998 | Meehan et al. | |
| 5,731,839 A * | 3/1998 | Panaro | 375/240.15 |
| 5,956,674 A * | 9/1999 | Smyth et al. | 704/200.1 |
| 6,057,882 A | 5/2000 | van den Branden Lambrecht | |
| 6,281,929 B1 | 8/2001 | Fimoff | |
| 6,400,400 B1 | 6/2002 | Isnardi et al. | |
| 6,434,196 B1 * | 8/2002 | Sethuraman et al. | 375/240.12 |
| 6,741,277 B1 | 5/2004 | Rau | |
| 6,891,565 B1 * | 5/2005 | Dieterich | 348/180 |
| 7,076,392 B1 | 7/2006 | Wilson | |
| 7,391,434 B2 * | 6/2008 | Yang | 348/181 |
| 2002/0007492 A1 | 1/2002 | Smyth et al. | |
| 2002/0046308 A1 | 4/2002 | Devlin | |
| 2003/0076418 A1 | 4/2003 | Nishio | |

FOREIGN PATENT DOCUMENTS

EP 0896483 2/1999

OTHER PUBLICATIONS

Kim, C. et al., "Design of MPEG-2 Video Test Bitstreams," IEEE Transactions on Consumer Electronics, vol. 45, No. 4, Nov. 1999, pp. 1213-1220, XP002348144.
EPO Communication dated Aug. 20, 2009 in European Patent Application No. 05254651.2 filed Jul. 26, 2005 by Chao-Kung Yang.

* cited by examiner

*Primary Examiner*—Paulos M Natnael

(57) ABSTRACT

The present invention is a method for MPEG compliance testing that designs test bit streams such that every frame of the expected decoded video is known. The test bit stream is generated, decoded and stored as an expected output decoded video. The test bit stream is fed to the device under test where it is decoded. Actual output video is compared with the expected decoded video on a frame-by-frame basis. The test results are indicated by discrepancies, which can be visually examined by human or by computer, through a comparison of the two videos. During generation of the test bit stream, for a given GOP structure, the subsequent P and B frames are determined by varying the selected testing MPEG parameter with the whole range of its possible values, while keeping other parameters constant.

16 Claims, 2 Drawing Sheets

VIDEO BIT STREAM TEST

CROSS-REFERENCE TO RELATED APPLICATIONS

This application is a continuation of U.S. patent application Ser. No. 10/900,845 for "VIDEO BIT STREAM TEST" by Chao-Kung Yang, filed Jul. 27, 2004, which is hereby incorporated by reference herein.

TECHNICAL FIELD

The present invention relates generally to a method for MPEG compliance testing for a decoder device and more particularly to a video test bit stream for MPEG compliance testing of a set top box, also known as an integrated receiver/decoder.

BACKGROUND OF THE INVENTION

Television systems that receive digital video data streams that have been encoded and compressed require a decoder, such as an integrated receiver/decoder, to decode and decompress the incoming digital video data streams. To ensure proper operation of the decoder, it is necessary to perform tests to determine if the video decoders are properly decoding and decompressing the digital video data streams.

An organization called Moving Pictures Experts Group (MPEG) created standards to establish a standard coding and decoding strategy to try to minimize problems with interoperability of equipment. Test bit streams are provided by the MPEG committee. The bit streams contain various types of content and are generated by feeding the video through the software MPEG encoder. The test bit streams provide adequate materials for testing the development of the MPEG algorithm. However, they fail to exercise all possible values of the MPEG parameters.

For many years, other suppliers have provided standard test bit streams for MPEG-compliance video testing. One current test is based on preserving an error through its testing cycle. An error is usually evidenced by the erroneous final image of the test sequence. There are several drawbacks associated with the current testing method.

One such drawback is that the results of the testing conditions are determined by human perception of the video images. When the error conditions are subtle, the testing operators are not always able to discern their existence.

Another drawback is that there are certain errors that are not suitable for testing using the current test bit stream method. Examples include integrated receiver/decoder timing error and frame skipping/repeating error. These problems go undetected because the current method does not include adequate timing information.

Yet another drawback is the conflict between the typical group of picture (GOP) structure used for testing and the practical GOP structure used for broadcasting. MPEG allows for one long group of picture (GOP) structure. However, this is not the typical structure for practical GOP use. Typically integrated receiver/decoders are designed to handle a limited GOP duration, which is usually one-half to one-second periods due to the requirement of starting video from a random position. Due to the emphasis on the human visual pass/fail conditions and real-time testing by the current "predictive" testing method, the error evidence has to be preserved until the video stops. Therefore, the testing video sequence can only be constructed in one long GOP.

SUMMARY OF THE INVENTION

The present invention is a method for MPEG compliance testing that designs test bit streams such that every frame of the expected decoded video is known. The test bit stream is generated, decoded and stored as an expected output decoded video. The test bit stream is fed to the device under test where it is decoded. Actual output video is compared with the expected decoded video on a frame-by-frame basis. The test results are indicated by discrepancies, which can be visually examined by either a human or a computer, through a comparison of the expected video and the actual output video.

It is an object of the present invention to improve the accuracy of MPEG compliance testing. It is another object of the present invention to eliminate the drawbacks associated with human error in detecting errors during the testing process. It is still another object of the present invention to detect errors associated with timing error, skipping error, and repeating error.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

The present invention is a method for MPEG compliance testing of set-top boxes (STBs), also known as integrated receiver/decoders (IRDs). A video test bit stream is constructed such that every frame of the expected decoded video is known. The decoded expected video is stored. The constructed test bit stream is run through the STB and the output video is compared with the expected decoded video on a frame-by-frame basis. The test can be done in real time, as the video is output. In the alternative, the output video can be recorded and compared at a later time. In either event, the test results are indicated by discrepancies between the stored known results of the constructed test bit stream and the output video of the set top box after the test bit stream is decoded by the device under test.

Figure 1:
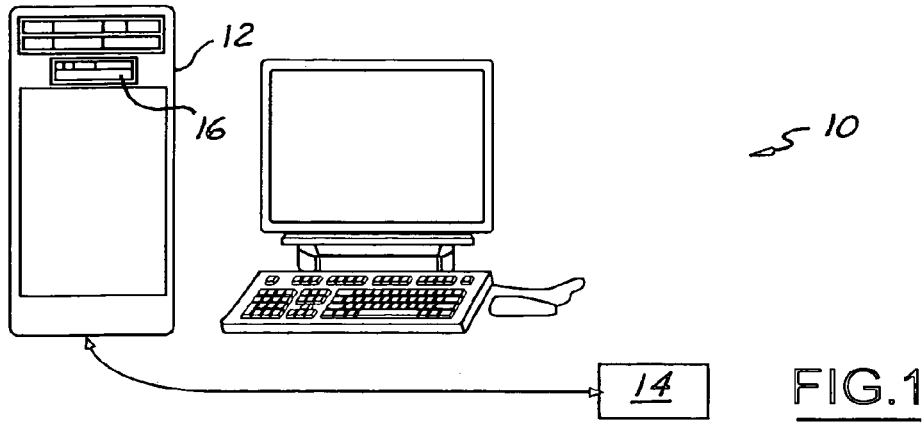
FIG. 1 is a block diagram of the bit stream testing system of the present invention.

Referring now to FIG. 1, there is shown a set top box testing system 10 of the present invention. A computer 12, or other processing device, is used to generate the test bit stream and decode the test bit stream. Therefore, every frame of the expected decoded output video is known. The expected decoded output video is stored on the computer. It is possible to select frames from the known decoded output video for later comparison.

The constructed test bit stream is formatted into its proper form which is dependent on the device under test. The constructed test bit stream is then fed to the device under test 14, such as the STB or IRD, where it is decoded. The device under test 14 outputs video as it decodes the constructed test bit stream. This output video is recorded 16 and stored on the computer 12. The output video from the device under test is compared with the expected decoded output video stored on the computer 12, or the frames selected from the expected decoded output video.

If the device under test 14 has decoded the video without any error, the frames of the differential video will be black. If some of the differential video frames are not black, there are errors present. It is possible to examine where and when the non-black pixels occur to determine the error.

Figure 2:
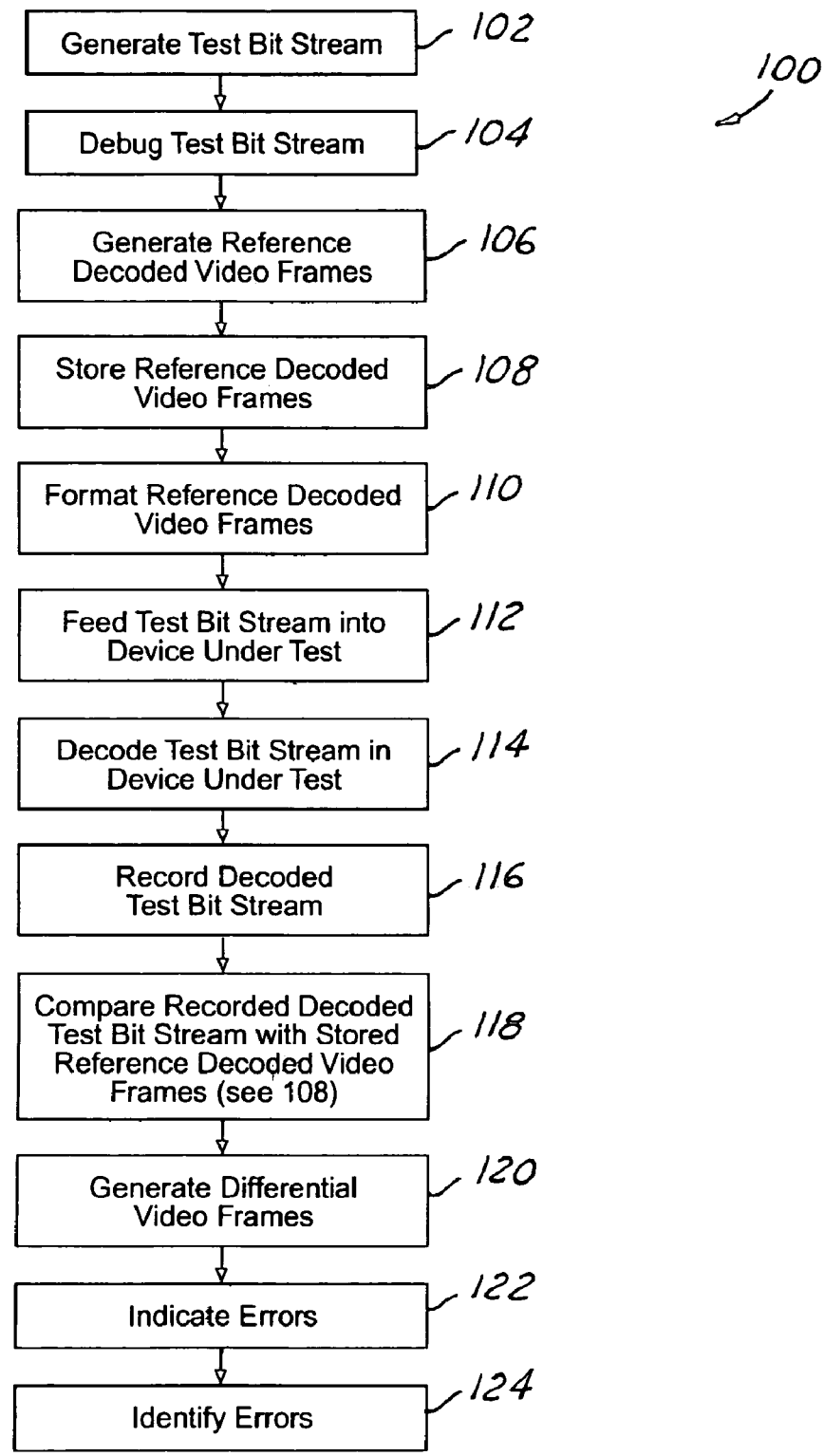
FIG. 2 is a flow chart of the method of bit stream test process according to the present invention.

FIG. 2 is a flow chart of the testing method 100. The computer generates 102 an MPEG elementary video test bit stream, which will be discussed in detail hereinafter with reference to FIGS. 3 and 4. Still referring to FIG. 2, after the bit stream is constructed, it is fed through 104 a debugged software decoder to generate 106 reference decoded video frames from the expected decoded output video. The reference decoded video frames are stored 108 on the computer for later comparison. The constructed test bit stream is formatted 110 into its proper form for the device under test. For example, the test bit stream may be formatted to the form required for satellite receiving.

The constructed test bit stream is fed 112 into the device under test, where it is decoded 114 by the device under test. The output video from the device under test is compared 118, or recorded and stored 116 and compared 118, with the pre-stored reference decoded video frames to generate differential video frames 120. The test results will indicate an error 122 by non-black pixels in the differential video. If some of the differential frames are not black, it is possible to determine where and when the non-black pixels occur, and then the error can be identified 124. If the test is without any error, the frames of differential video will be all black.

MPEG video consists of a hierarchy of layers. The first layer is the video sequence layer, the second layer is the group of pictures (GOP), which is composed of one of more groups of intra frames (I-frames) and non-intra frames (P and B frames). The third layer is the picture itself. And the fourth layer is called the slice layer. This information is useful in conjunction with the following explanation of the generation of the test bit stream.

Figure 3:
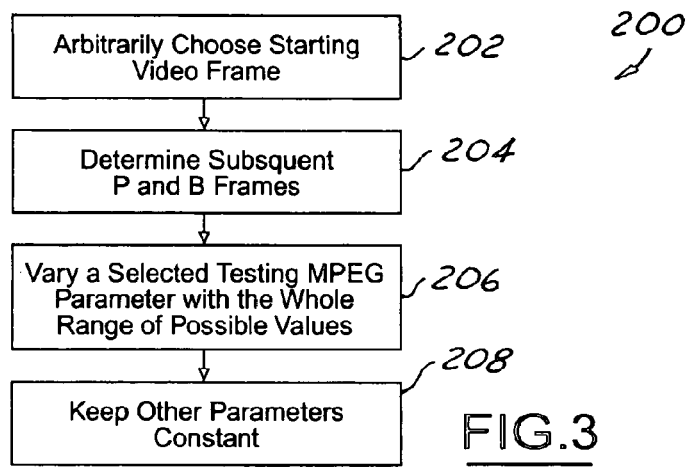
FIG. 3 is a flow chart of the method for generating the bit stream.

Referring now to FIG. 3, a flowchart is shown for the method 200 of constructing the test bit stream. A starting video frame, also called an I-frame, is arbitrarily chosen 202. For a given GOP structure, for example N=15, M=3, the subsequent P and B frames are determined 204 by varying 206 the selected testing MPEG parameter with the whole range of its possible values, while keeping other parameters constant 208. This is a significant advantage over prior art methods that do not take the whole range of possible parameter values into consideration when generating a test bit stream.

According to the present invention, only the starting I-frame is known. After the starting frame, the rest of the frames become unpredictable. Therefore, to recreate the video sequence, the bit stream is fed through a debugged software decoder after its construction to produce the expected decoded output video used in the comparison. All re-created video frames constitute the expected decoded video and are stored as reference frames.

In MPEG format, an I frame is a starting frame. It is coded spatially with no reference to any other frame. For a P frame, the encoder predicts a future frame from an I frame or another P frame in a forward time manner. For a B frame, or bi-directional frame, the encoder has the option of using forward/backward interpolated prediction. I frames are coded spatially, P frames are forward predicted based on previous I and P frames, and B frames are coded based on a forward prediction from a previous I or P frame, as well as a backward prediction from a succeeding I or P frame.

Figure 4:
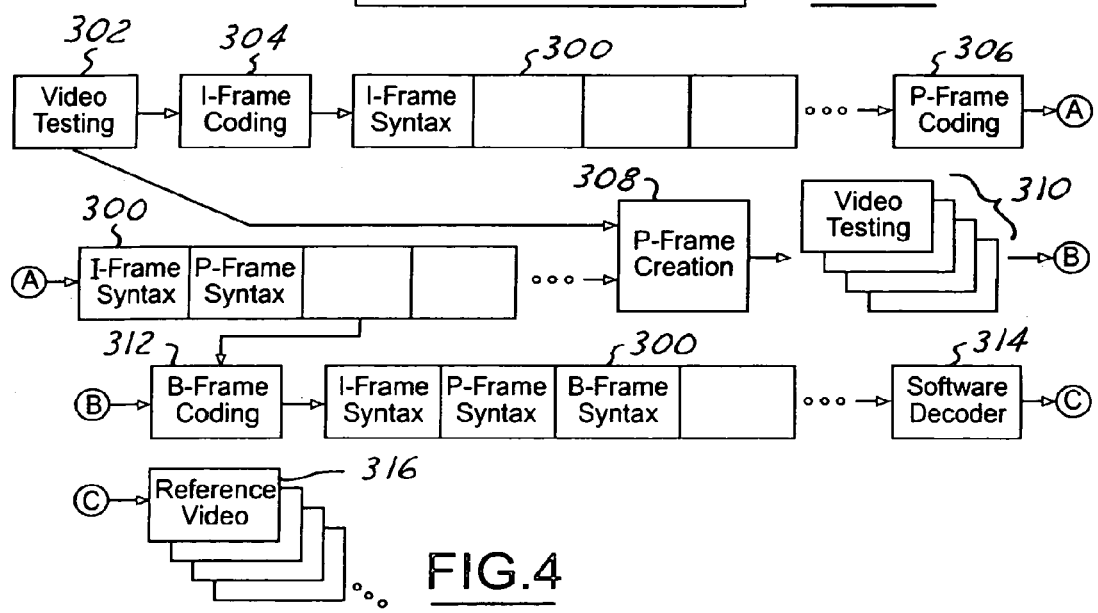
FIG. 4 is a block diagram of the bit stream generation process.

FIG. 4 is an example of how the constructed test bit stream 300 is generated. A starting I-frame is arbitrarily chosen from the video 302. The I-frame is coded 304 and the I-frame syntax become part of the test bit stream 300. Likewise, the P-frame is coded 306 and the P-frame syntax becomes part of the test bit stream 300. The creation of the P-frame 308 may be accomplished by frequency domain inverse transformation techniques, such as Inverse Discrete Cosine Transform (IDCT).

The frequency domain selected MPEG parameter is varied by all of its possible values 310. The B-frame is then coded 312, and the B-frame syntax becomes part of the test bit stream 300. The entire bit stream is fed through a software decoder 314, and reference video frames are selected to create the reference video 316.

According to the method of the present invention, which was described in detail above, the test bit stream is generated such that the expected output can be calculated analytically using a software decoder. The expected decoded output is then stored and used as a comparison to the output generated by the device under test. The comparison can be accomplished in real time, or recorded, stored and analyzed off line. An additional advantage is that the test bit stream can be designed in a special pattern, with the expected output known ahead of time The invention covers all alternatives, modifications, and equivalents, as may be included within the spirit and scope of the appended claims.

What is claimed is:

1. A method of testing a decoder, comprising the steps of:
   generating a data stream;
   calculating an expected decoded output from the data stream, the expected decoded output comprising a first plurality of video frames;
   decoding the data stream using the decoder to produce a measured output comprising a second plurality of video frames;
   generating a plurality of differential video frames, each differential video frame generated as a difference between one of the first plurality of video frames and an associated one of the second plurality of video frames, and
   identifying a decoder error from the plurality of differential video frames.

2. The method of claim 1, wherein the step of generating a data stream comprises the steps of:
   selecting an I frame of a Moving Picture Experts Group (MPEG)-formatted video;
   determining P frames and B frames subsequent to the I frame by varying an MPEG parameter while keeping other MPEG parameters constant; and
   generating the data stream from the I frame, and the P frames and the B frames.

3. The method of claim 2, wherein the MPEG parameter is a frequency-domain parameter.

4. The method of claim 1, wherein the step of calculating an expected decoded output from the data stream comprises:
   providing the data stream to a debugged decoder.

5. The method of claim 1, wherein the step of calculating an expected decoded output from the data stream comprises:
   computing the data stream using a software decoder.

6. The method of claim 1, wherein the step of identifying the decoder error from the plurality of differential video frames comprises the step of:
    identifying a non-black pixel as a decoder error.

7. The method of claim 6, further comprising the step of:
    determining the decoder error from where and when the non-black pixels occur.

8. An apparatus for testing a decoder, comprising:
    means for generating a data stream;
    means for calculating an expected decoded output from the data stream, the expected decoded output comprising a first plurality of video frames;
    means for providing the data stream to the decoder to produce an measured output comprising a second plurality of video frames;
    means for generating a plurality of differential video frames, each differential video frame generated as a difference between one of the first plurality of video frames and an associated one of the second plurality of video frames; and
    means for identifying a decoder error from the plurality of differential video frames.

9. The apparatus of claim 8, wherein the means for generating a data stream comprises the steps of:
    means for selecting an I frame of a Moving Picture Experts Group (MPEG)-formatted video;
    means for determining P frames and B frames subsequent to the I frame by varying an MPEG parameter while keeping other MPEG parameters constant; and
    generating the data steam from the I frame, and the P frames and the B frames.

10. The apparatus of claim 9, wherein the MPEG parameter is a frequency-domain parameter.

11. The apparatus of claim 8, wherein the means for calculating an expected decoded output from the data steam comprises a debugged decoder.

12. The apparatus of claim 8, wherein the means for calculating an expected decoded output from the data stream comprises a software decoder.

13. The apparatus of claim 8, wherein the means for identifying the decoder error from the plurality of differential video frames comprises the step of:
    means for identifying a non-black pixel as a decoder error.

14. The apparatus of claim 13, further comprising means for determining the decoder error from where and when the non-black pixels occur.

15. The method of claim 2, wherein the MPEG parameter is varied to the whole range of its possible values.

16. The apparatus of claim 8, wherein the MPEG parameter is varied to the whole range of its possible values.

* * * * *